US007877023B2

(12) United States Patent
Uto (10) Patent No.: US 7,877,023 B2
(45) Date of Patent: Jan. 25, 2011

(54) LIGHT DETECTOR DETECTING OPTICAL SIGNAL LOSS IN AN OPTICAL COMMUNICATION SYSTEM

(75) Inventor: Kenichi Uto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 650 days.

(21) Appl. No.: 11/865,831

(22) Filed: Oct. 2, 2007

(65) Prior Publication Data

US 2008/0152358 A1 Jun. 26, 2008

(30) Foreign Application Priority Data

Dec. 26, 2006 (JP) ............... 2006-350129

(51) Int. Cl.
*H04B 10/06* (2006.01)
(52) U.S. Cl. .................. 398/202; 398/209; 398/208; 398/25; 398/24
(58) Field of Classification Search ......... 398/202–209, 398/25, 1, 24
See application file for complete search history.

(56) References Cited

U.S. PATENT DOCUMENTS

| 5,907,429 | A | 5/1999 | Sugata | |
|---|---|---|---|---|
| 5,933,097 | A * | 8/1999 | Sakurai et al. | 340/928 |
| 6,856,771 | B2 * | 2/2005 | Taga et al. | 398/202 |
| 6,907,202 | B1 * | 6/2005 | Ide et al. | 398/208 |
| 7,194,308 | B2 * | 3/2007 | Krig et al. | 607/29 |
| 7,250,806 | B2 * | 7/2007 | Zhang | 327/513 |
| 7,414,234 | B1 * | 8/2008 | Teeter et al. | 250/214 R |
| 7,508,497 | B2 * | 3/2009 | LaBelle | 356/5.01 |
| 2002/0051271 | A1 * | 5/2002 | Yoshikoshi | 359/189 |
| 2006/0025949 | A1 * | 2/2006 | McCavit et al. | 702/85 |
| 2008/0002985 | A1 * | 1/2008 | Shang et al. | 398/141 |
| 2008/0118252 | A1 * | 5/2008 | Chow et al. | 398/202 |

FOREIGN PATENT DOCUMENTS

| CN | 1581735 A | 2/2005 |
|---|---|---|
| JP | 7-162446 | 6/1995 |
| JP | 10-262032 | 9/1998 |
| JP | 2005-20417 | 1/2005 |
| JP | 2005-354485 | 12/2005 |

OTHER PUBLICATIONS

SFF Committee: "INF-8074i Specification for SFP (Small Formfactor Pluggable) Transceiver" Rev. 1.0, pp. 1-38, May 12, 2001.
Govind P. Agrawal: "Fiber-Optic Communcation Systems", Wiley-Interscience, pp. 162-169.

* cited by examiner

*Primary Examiner*—Li Liu
*Assistant Examiner*—Hibret A Woldekidan
(74) *Attorney, Agent, or Firm*—Leydig, Voit & Mayer, Ltd.

(57) ABSTRACT

A light receiver has a photoelectric conversion circuit which converts an input optical signal into an electrical signal, an electric amplifier which amplifies the electrical signal output from the photoelectric conversion circuit, a threshold adjustment circuit which outputs a threshold value according to signal information in the optical signal, and an optical signal loss detection circuit which compares amplitude of the electric signal output from the electric amplifier with the threshold value output from the threshold adjustment circuit and outputs results of the comparison.

5 Claims, 8 Drawing Sheets

LIGHT DETECTOR DETECTING OPTICAL SIGNAL LOSS IN AN OPTICAL COMMUNICATION SYSTEM

BACKGROUND OF THE INVENTION

1. Field of the Invention

The present invention relates to a light receiver applied to an optical communication system using different communication protocols and, more particularly, to a light receiver capable of detecting a signal loss in an optical signal by following the receiving sensitivity.

2. Background Art

In an optical communication system, information such as a speech, a piece of electronic mail or electronic data including character and image information, typified by data transmitted in the Internet, is encoded into an optical signal in accordance with a frame system determined in a particular communication protocol to be transmitted through an optical fiber. A light receiver has the function of converting an encoded optical signal into an electrical signal.

Figure 9:
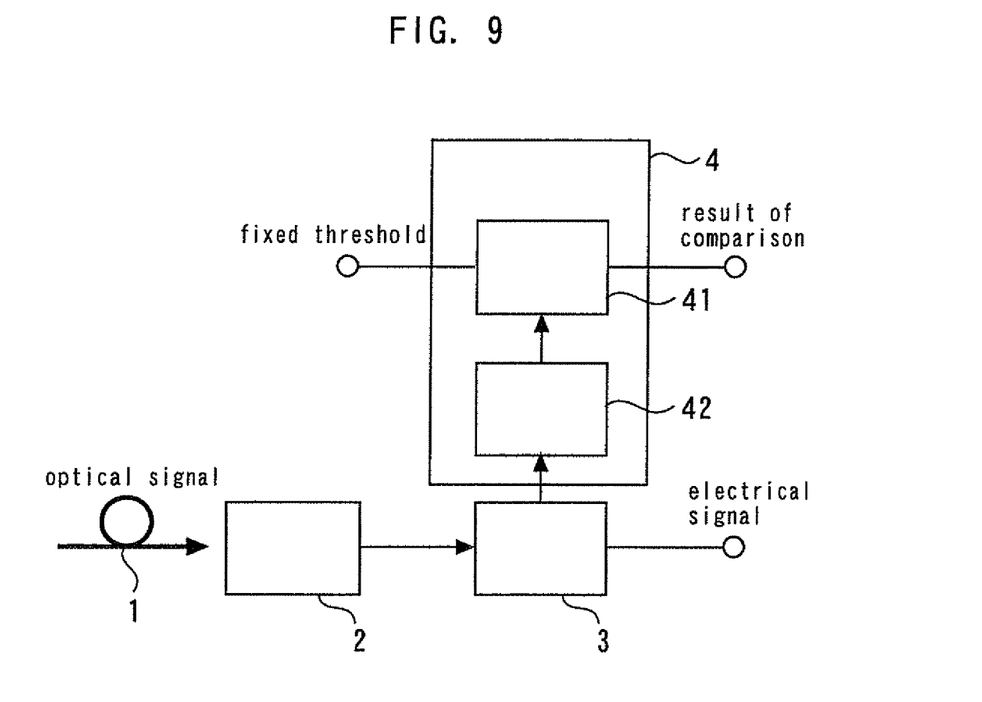
FIG. 9 is a diagram showing the configuration of a conventional light receiver.

FIG. 9 is a diagram showing the configuration of a conventional light receiver. As shown in FIG. 9, the light receiver is connected to an optical fiber 1 and has a photoelectric conversion circuit 2, an electric amplifier 3, and an optical signal loss detection circuit 4. The optical signal loss detection circuit 4 has a comparator 41 and a signal detection circuit (peak detection circuit) 42. The signal detection circuit 42 is a circuit for detecting a signal component in the electric amplifier 3. More specifically, the signal detection circuit 42 uses a peak detection output from a signal component. The comparator 41 compares a signal component detected by the signal detection circuit and a fixed threshold value given from the outside and outputs the result of comparison.

The operation of the conventional light receiver will be described. The photoelectric conversion circuit 2 first converts an optical signal transmitted through the optical fiber 1 into an electrical signal. The electric amplifier 3 then amplifies the converted electrical signal to a signal amplitude discriminable in a stage following the light receiver. The optical signal loss detection circuit 4 compares the electrical amplitude of the output signal from the electric amplifier 3 with the predetermined threshold value and determines whether or not the level of the optical signal input to the light receiver is larger than the predetermined threshold value. The optical signal loss detection circuit 4 outputs a digital signal based on the yes/no determination with respect to the threshold value.

The optical signal loss detection circuit 4 is used to detect an optical signal break. In an electrical signal processing block following the light receiver, detection can be performed by using the result of this optical signal loss detection as to whether or not there is any circuit abnormality, for example, due to a break in the optical fiber transmission line constituting a main circuit of the optical communication system and whether or not there is any abnormality in the operation on the transmitting side, for example, due to a reduction in optical output from a light transmitter. For example, in a situation where a circuit abnormality has occurred, for example, due to a break in the optical fiber transmission line, the above-described arrangement enables execution of a circuit changing operation in the electrical signal processing block following the light receiver to avoid a communication abnormality in a comparatively short time. Thus, the optical signal loss detection function of the light receiver is useful in maintenance and management of the optical communication system.

However, different communication protocols coexist in a communication system from an optical submarine cable, an intercity trunk network or the like to subscriber networks in buildings for example. More specifically, in circuits typified by a trunk system, encoding methods called ITU-T (International Telecommunication Union-Telecommunication sector), SDH (Synchronous Digital Hierarchy) in accordance with the Bellcore international standard, and SONET (Synchronous Optical Network) are used as communication protocols. In SDH and SONET, frame formats are determined in accordance with unique encoding methods and transmission rates corresponding to multiples of 4: 155.52 Megabit per second (Mbps), 622.08 Mbps, 2.48832 Gbps and 9.95328 Gbps are determined according to the circuit capacity.

For circuits typified by a local area network (LAN) provided as a subscriber system, a frame system called Ethernet (trademark) in conformity with the IEEE802.3 internal standard exists. In the Ethernet (trademark) frame system, a frame system in conformity with a unique encoding method is also specified. Also, the Ethernet system is divided into Fast Ethernet (trademark), Giga Bit Ethernet (trademark) and 10 Gaga Bit Ethernet (trademark) in which the transmission rate is specified at multiples of 10: 100 Mbps, 1 Gbps and 10 Gbps, respectively, according to the circuit capacity. Other communication protocols, e.g., FDDI (Fibre Distributer Data Interface), ESCON (Enterprise System Connection) and FC (Fibre Channel) exist. Not only the signal encoding method but also the transmission rate varies among different communication protocols.

Figure 10:
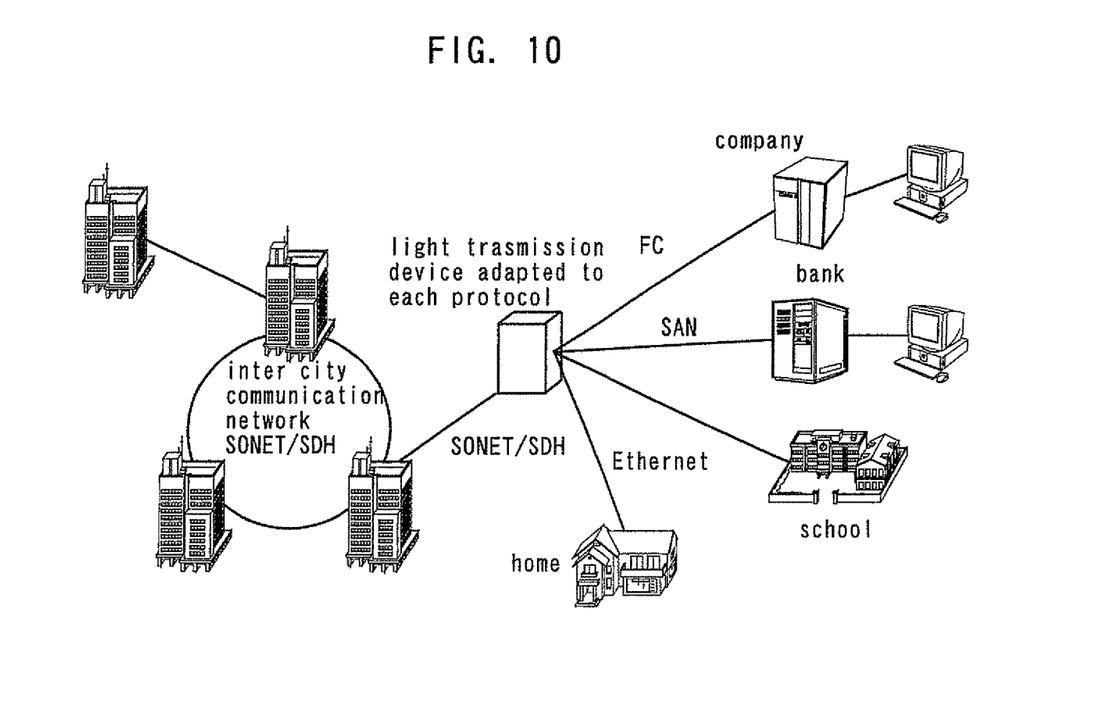
FIG. 10 is a diagram schematically showing a communication system using different communication protocols.

FIG. 10 is a diagram schematically showing a communication system using different communication protocols. SDH/SONET is used for a circuit network connecting buildings, called an intercity communication network. For a LAN used in a building, a communication protocol such as Ethernet (trademark), FDDI, ESCON or FC is used. It is, therefore, necessary for a light transmission device provided at a building inlet to be adapted to each protocol. From the viewpoint of minimizing the investment cost for optical communication devices, there is a demand for a light transmission device capable of operation with both an existing communication protocol and a new communication protocol using one physical layer.

As described above, there is a demand for a multiprotocol-compatible light transmission device. Adapting a light transmission device to different communication protocols and to different transmission rates requires securing a wider-band main signal characteristic for adaptation of the pass band of a main signal line to the range of transmission rates from a low transmission rate to a high transmission rate. Under the present circumstances, the band is limited by the device capacity. Therefore the range of transmission rates realizable on one physical layer is 100 Mbps to 2.5 Gbps, and an applicable communication protocol is determined according to the range.

Figure 11:
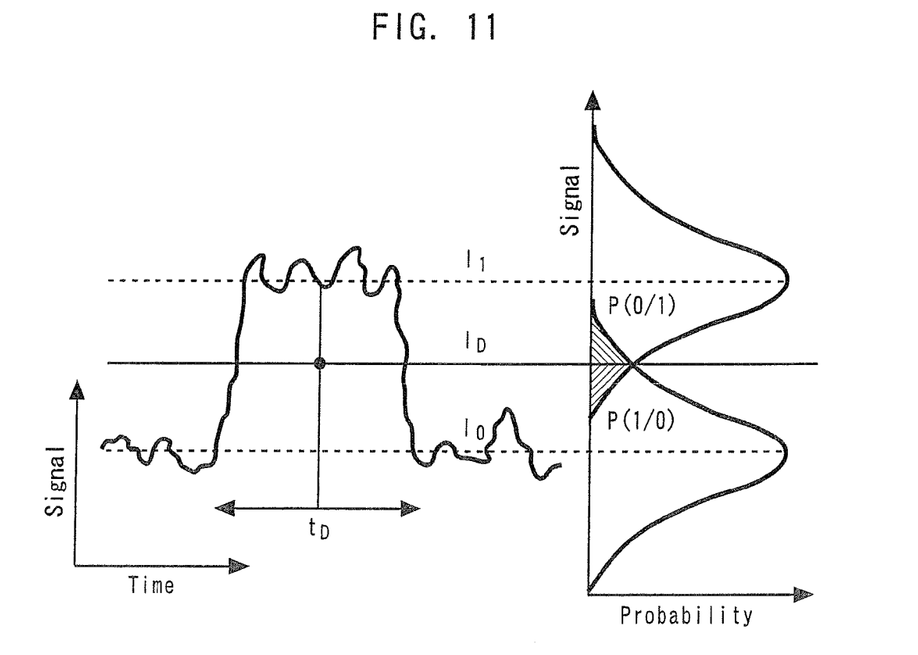
FIG. 11 is a diagram for the concept of the receiving sensitivity, showing a signal component waveform with respect to time (left-hand side) and a signal component probability distribution (right-hand side).

The performance required of a light receiver for a multi-protocol-compatible light transmission device will be described. In general, the receiving sensitivity (bit error ratio: BER) represents an index for the performance. The receiving sensitivity can be obtained from the ratio of a signal component and a noise component called Q value (see, for example, GovindP. Agrawal "Fiber-Optic Communication Systems", published from Wiley-Interscience). FIG. 11 is a diagram for the concept of the receiving sensitivity, showing a signal component waveform with respect to time (left-hand side) and a signal component probability distribution (right-hand side). The minimum receiving sensitivity refers to average light input power when the error rate per bit exceeds a certain value and to a threshold value at which the signal level can be correctly determined.

A case where, in a modulated signal in which the probability of occurrence of a level (mark) "1" (mark rate) is ½ in optical communication using a digital communication system, noise distributions with respect to the levels of the mark and "0" (space) are obtained as Gaussian distributions will be considered. The receiving sensitivity BER of a light receiver is expressed by the following equation (1) in which $I_D$ represents the discrimination level of the light receiver, $I_1$ the mark-side light intensity, $I_0$ the space-side light intensity, $\sigma_1$ noise around the mark-side light intensity, and $\sigma_0$ noise around the space-side light intensity.

$$BER = \frac{1}{4} \times \left[ \mathrm{erfc}\left(\frac{I_1 - I_D}{\sigma_1 \sqrt{2}}\right) + \mathrm{erfc}\left(\frac{I_D - I_0}{\sigma_0 \sqrt{2}}\right) \right] \quad (1)$$

The coincidence between the error rates on the mark and space sides as shown in equation (2) means that the discrimination level of the light receiver is set to an optimum level such that the code error rate is minimized independently of received light power. In this case, the light receiving sensitivity BER of the light receiver is expressed by equation (3).

$$\frac{I_1 - I_D}{\sigma_1} = \frac{I_D - I_0}{\sigma_0} = Q \quad (2)$$

$$BER = \frac{1}{2} \times \mathrm{erfc}\left(\frac{Q}{\sqrt{2}}\right) \quad (3)$$

From equation (2), the discrimination level $I_D$ of the light receiver is expressed by equation (4).

$$I_D = \frac{\sigma_0 I_1 + \sigma_1 I_0}{\sigma_0 + \sigma_1} \quad (4)$$

Equation (4) is substituted in equation (2) to express the Q value as shown by equation (5).

$$Q = \frac{I_1 - I_0}{\sigma_1 + \sigma_0} \quad (5)$$

If the extinction ratio of the received light waveform is considered infinite, $I_0 \leq 0$. Further, the mark-side light intensity $I_1$ can be obtained from the average received light power $P_{in}$ [W] and the conversion efficiency R [A/W]. Noise $\sigma_1$ around the mark-side light intensity can be expressed by shot noise $\sigma_s$ in the light receiving element and thermal noise $\sigma_T$ in an electric amplification stage following the light receiving element. Noise $\sigma_0$ around the space-side light intensity can be expressed by thermal noise $\sigma_T$ in the electric amplification stage. As a result, equation (6) is derived.

$$Q \approx \frac{RP_{in}}{(\sigma_s^2 + \sigma_T^2)^{1/2} + \sigma_T} \quad (6)$$

Shot noise $\sigma_s$ can be expressed by equation (7), and thermal noise $\sigma_T$ can be expressed by equation (8). In equations 7 and 8, q represents the amount of charge per electron [C], $I_d$ dark current [A] through the light receiving element, $\Delta f$ the band contributing to noise, $k_B$ the Boltzmann constant, T the absolute temperature and $R_L$ the load resistance corresponding to the resistance of a feedback resistor of the photoelectric conversion circuit.

$$\sigma_s^2 \approx 2q(RP_{in} + I_d)\Delta f \quad (7)$$

$$\sigma_T^2 \approx (4k_B T/R_L)\Delta f \quad (8)$$

Figure 12:
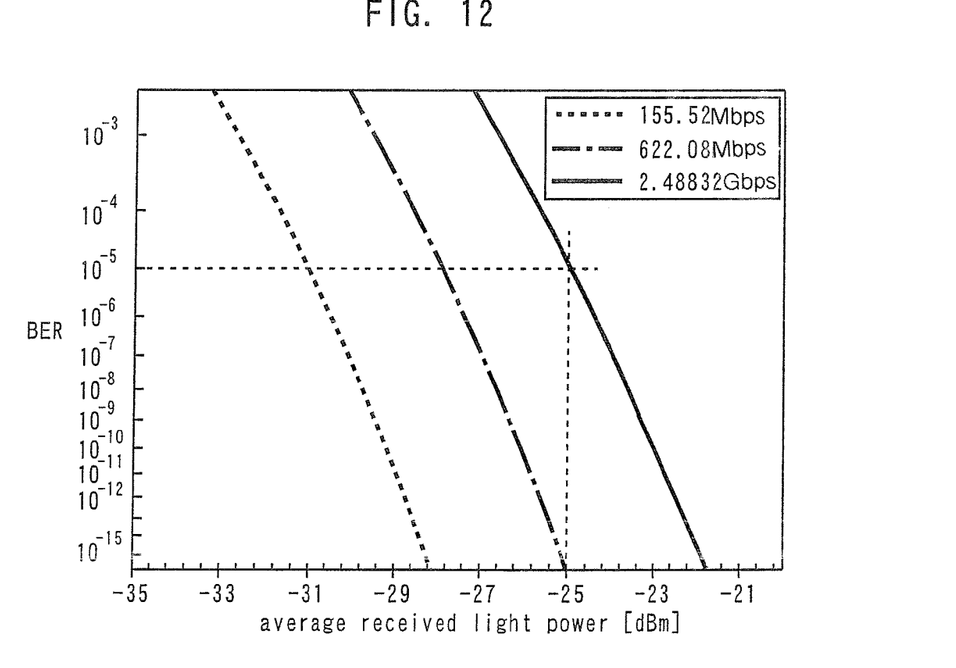
FIG. 12 is a diagram schematically showing the relationship between BER computed and the average received light power with respect to each of transmission rates.

FIG. 12 is a diagram schematically showing the relationship between BER computed by using equations (3) and (6) to (8) and the average received light power with respect to each of transmission rates of 155.52 Mbps, 622.08 Mbps and 2.48832 Gbps. It can be understood from FIG. 12 that BER changes with changes in transmission rate. This discussion presupposes use of the same light receiver and limiting the pass band contributing to noise with respect to each transmission rate. Accordingly, the differences between the BER values shown in FIG. 12 are due to the fact that each of the bands contributing to noise out of the main signal band is cut. Also, the pass band of an electronic device used in the light receiver is sufficiently wide, and the pass band is optimized with respect to each transmission rate by the filtering function of the light receiver. Thus, the band $\Delta f$ contributing to noise determining shot noise $\sigma_s$ and thermal noise $\sigma_T$ defined by equation (6) varies.

It can also be understood from FIG. 12 that if the transmission rate is reduced to about ¼, the average input received light power level to provide the same BER is improved by about 3 dB. In general, in an optical fiber transmission line using the ordinary dispersion fiber in the most widespread use heretofore, the distance between light transmission devices can be increased if the minimum receiving sensitivity of the light receiver is lower. It is thought that the transmission distance can be increased if the transmission rate is reduced, and that long-distance transmission becomes difficult if the transmission rate is increased.

However, the threshold value determined in the optical signal loss detection circuit 4 is a value determined with respect to input signal intensity $I_f = R^* P_{in}$ determined in the numerator of equation (6). That is, the threshold value is expressed by equation (9) below, and is determined independently of the noise terms that determine the value of the receiving sensitivity BER. A in equation (9) is a certain constant. Therefore the threshold value is not influenced by any change in the band contributing to noise when the transmission rate is changed.

$$I_{th} \approx RP_{in} \times A \quad (9)$$

In the conventional light receiver, the threshold value is fixed with respect to the transmission rate used at the time of initial adjustment. Therefore, when a transmission rate different from that used at the time of initial adjustment is used, the receiving sensitivity BER is changed but the threshold value is not changed. For example, when the transmission rate is changed from 2.48832 Gbps to 622.08 Mbps or 155.52 Mbps in a case where as shown in FIG. 12 the threshold value is set to an average received light power level of about −25.0 dBm corresponding to BER $1 \times 10^{-5}$ at the transmission rate 2.48832 Gbps, the operation is error-free such that BER is $1 \times 10^{-5}$ or less, but the threshold value does not change by following the transmission rate. Therefore, even if the threshold value is initialized to enable detection of an optical signal break at BER $1 \times 10^{-5}$, failure to continue detection of an optical signal break occurs if the transmission rate is changed from the initial value. Thus, the detection accuracy of the optical signal loss detection circuit is reduced and even a communication condition at a receiving sensitivity at which low-error communication can be performed is recognized as the impossibility of communication or circuit failure, resulting in a reduction in operation efficiency of the transmission device and failure to achieve the desired performance.

As described above, the conventional light receiver has a problem that in the case of application of a light transmission device for multiprotocol use the operation efficiency of the transmission device is reduced. That is, different encoding methods are used in different communication protocols and the signal frame pattern and the transmission rate vary, resulting in failure to detect a signal break in an optical signal by following the receiving sensitivity.

SUMMARY OF THE INVENTION

In view of the above-described problems, an object of the present invention is to provide a light receiver capable of detecting a signal break in an optical signal by following the receiving sensitivity.

According to one aspect of the present invention, a light receiver has a photoelectric conversion circuit which converts an input optical signal into an electrical signal, an electric amplifier which amplifies the electrical signal output from the photoelectric conversion circuit, a threshold adjustment circuit which outputs a threshold value according to signal information in the optical signal, and an optical signal loss detection circuit which compares the electrical amplitude of the electric signal output from the electric amplifier with the threshold value output from the threshold adjustment circuit and outputs the results of comparison.

The present invention makes it possible to detect a signal break in an optical signal by following the receiving sensitivity.

BEST MODE OF CARRYING OUT THE INVENTION

Other and further objects, features and advantages of the invention will appear more fully from the following description.

DETAILED DESCRIPTION OF THE PREFERRED EMBODIMENTS

First Embodiment

Figure 1:
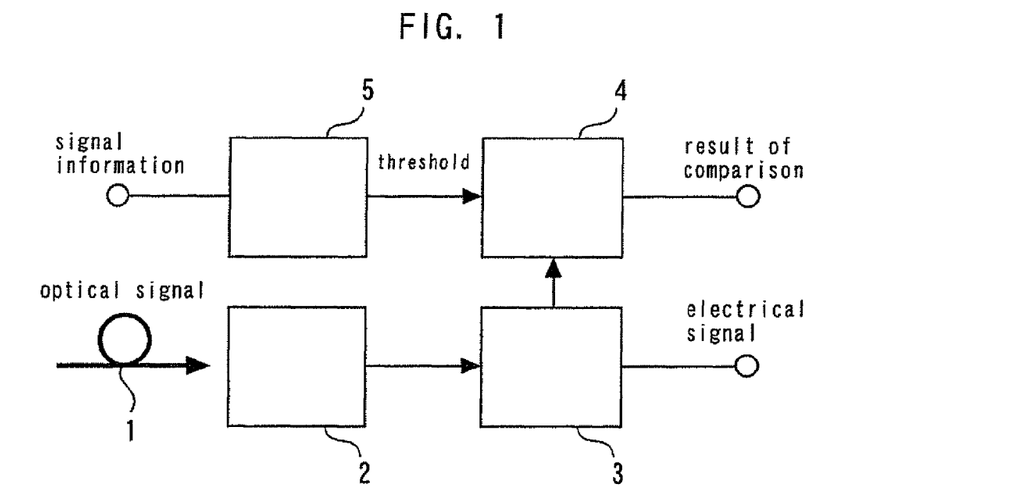
FIG. 1 is a diagram showing the configuration of a light receiver according to a first embodiment of the present invention.

FIG. 1 is a diagram showing the configuration of a light receiver according to a first embodiment of the present invention. As shown in FIG. 1, the light receiver is connected to an optical fiber 1 and has a photoelectric conversion circuit 2, an electric amplifier 3, an optical signal loss detection circuit 4, and a threshold adjustment circuit 5. That is, the light receiver according to the first embodiment differs from the conventional light receiver in having the threshold adjustment circuit 5.

The operation of the light receiver according to the first embodiment will be described. The photoelectric conversion circuit 2 first converts an optical signal transmitted through the optical fiber 1 into an electrical signal. The electric amplifier 3 then amplifies the converted electrical signal to a signal amplitude discriminable in a stage following the light receiver. The operation up to this stage is the same as that of the conventional light receiver.

The threshold adjustment circuit 5 then outputs a threshold value following the receiving sensitivity of the light receiver to the optical signal loss detection circuit 4 according to signal information in the optical signal. The optical signal loss detection circuit 4 compares the electrical amplitude of the output signal from the electric amplifier 3 with the threshold value and outputs a digital signal based on the result of comparison.

The threshold adjustment circuit 5 adjusts the threshold value according to signal information such as a communication protocol and a digital signal encoding method provided in the optical signal. For example, if the optical signal input to the light receiver has signal information in conformity with the ITU-T international standard SDH/STM-16, the threshold adjustment circuit 5 determines A=X as the constant in equation (9) for computing the threshold value. If the optical signal input to the light receiver has signal information in conformity with the IEEE802.3 international standard Fast Ethernet (trademark), the threshold adjustment circuit 5 determines A=Y as the constant in equation (9) for computing the threshold value. Different thresholds values are thus determined in correspondence with different protocols.

The signal information comprises two control instances: H/W control and S/W control. According to H/W control, two protocol section terminals are provided in an electric connector interface of the light receiver and one pin is regarded as one bit, thereby enabling selection from 2 bits/4 different protocols. According to S/W control, a binary signal for each protocol defined in advance is written to a memory area in the light receiver from the outside of the light receiver to enable detection in the light receiver as to which protocol has been set and, hence, selection from a plurality of protocols. Descriptions about protocol settings have been generalized.

SFF-8079/8089 from the SFF Committee, a SFP standardization group is a reference material for the generalized description.

Addition of the threshold adjustment circuit 5 to the conventional light receiver ensures not only the coexistence of an existing communication protocol and a new communication protocol but also realization of an optimum circuit design according to communication protocols. This arrangement is useful particularly in an optical communication transmission device in which a plurality of communication protocols such as SDH/SONET, Ethernet (trademark), FDDI, ESCON and FC are used, for example, in a network between cities where there is a strong demand for an optical communication system. Thus, the need for changing light receivers according to communication protocols is eliminated to limit the investment cost for optical communication devices.

Since detection of a signal break in an optical signal following in the receiving sensitivity can be performed on the basis of the threshold value according to signal information, a high-accuracy optical signal loss detection function can be realized independently of communication protocols even in maintenance operation of an optical communication system. Therefore, the possibility of a communication condition being erroneously detected as the impossibility of communication or circuit failure even after a receiving sensitivity at which low-error communication can be performed in a particular communication protocol has been obtained is eliminated, thereby improving the operation efficiency of the transmission device.

Not only a situation where there are different communication protocols but also a situation where even under one communication protocol the number of identical-code continuous bits in a code pattern of an optical signal changes and the probability of occurrence of 1 and 0 levels (mark rate) of digital signal codes varies so that the signal level of the electric amplifier 3 varies may occur. In such a situation, the level of input to the optical signal loss detection circuit 4 varies to cause errors in optical signal loss detection. Even in such a case, if the threshold value is set in the threshold adjustment circuit 5 on the basis of signal information according to the encoding method for an optical signal, detection of a signal break in the optical signal following the receiving sensitivity can be performed with high accuracy under the one communication protocol.

Obtaining signal information, for example, in a state of being superimposed on an optical signal is conceivable. In such a case, the arrangement may be such that a signal detection circuit is added to the photoelectric conversion circuit 2 to separate signal information from an optical signal and perform filtering on frequencies. Signal information such as a communication protocol can be identified in this way.

Second Embodiment

Figure 2:
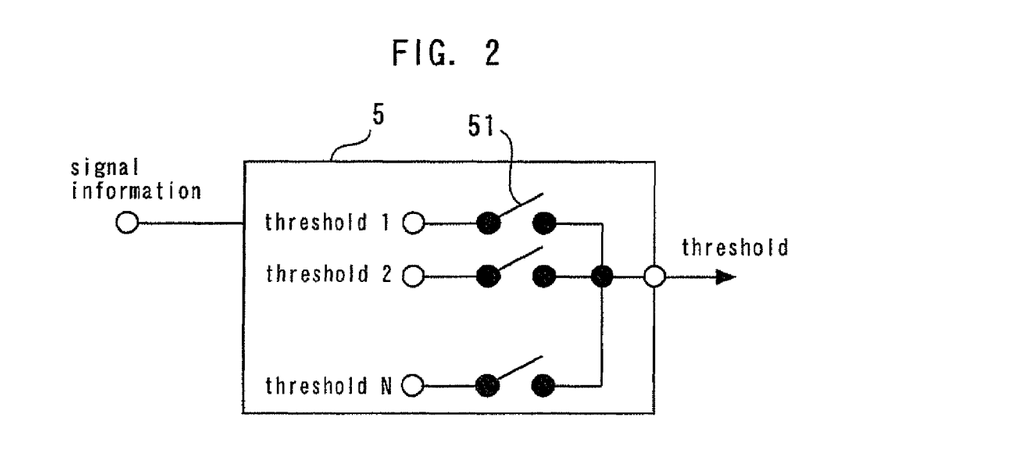
FIG. 2 is a diagram showing the configuration of a light receiver according to a second embodiment of the present invention.

FIG. 2 is a diagram showing the configuration of a light receiver according to a second embodiment of the present invention. In the light receiver according to the second embodiment, the threshold adjustment circuit 5 constituted by a plurality of hardware switches 51. In other respects, the configuration of the second embodiment is the same as that of the first embodiment.

The threshold adjustment circuit 5 according to this embodiment has a plurality of hardware switches 51 which selectively output a plurality of threshold values set in advance according to signal information in an input optical signal. By the switching operation of the hardware switches 51, the threshold value is adjusted according to a communication protocol. Each hardware switch 51 has its one end connected to a predetermined threshold value when in the on state. The other end of the hardware switch 51 is connected to a threshold value output terminal. The same number of hardware switches 51 as the number of kinds of communication protocols to be set are prepared. The hardware switch 51 corresponding to the communication protocol according to signal information in an optical signal is selected.

The threshold adjustment circuit 5 adjusts the threshold value so as to follow the receiving sensitivity according to signal information such as a communication protocol and a digital signal encoding method provided in an optical signal. The same effect as that of the first embodiment is achieved in this way. Use of hardware switches 51 enables operation at a comparatively high speed, although the speed depends on the response limit of the switching device.

Third Embodiment

Figure 3:
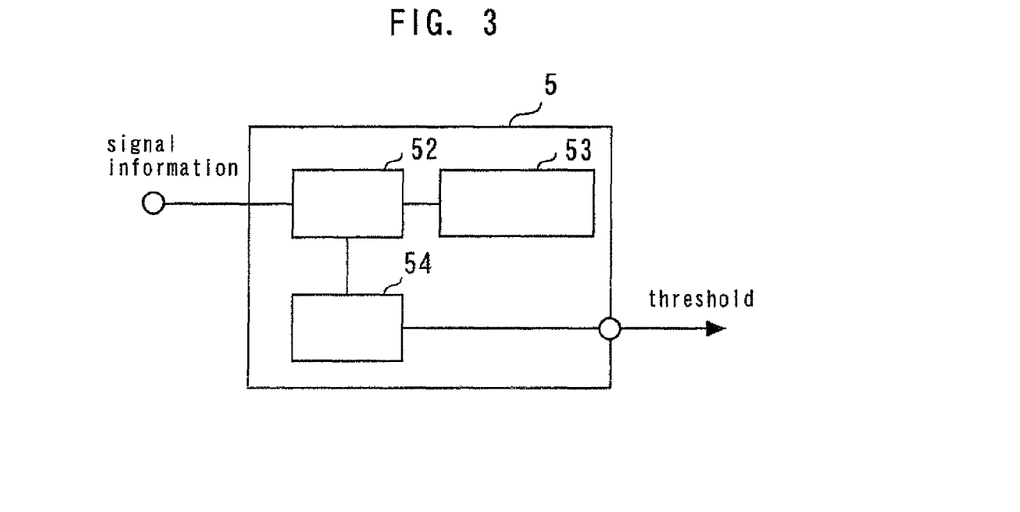
FIG. 3 is a diagram showing the configuration of a light receiver according to a third embodiment of the present invention.

FIG. 3 is a diagram showing the configuration of a light receiver according to a third embodiment of the present invention. In the light receiver according to the third embodiment, the threshold adjustment circuit 5 is constituted by a computation circuit 52, a memory 53 and a digital to analog (DA) converter 54. In other respects, the configuration of the third embodiment is the same as that of the first embodiment.

In the threshold adjustment circuit 5 according to this embodiment, the threshold value is adjusted with respect to each communication protocol by digital processing based on a piece of software according to signal information in an optical signal. In the memory 53, a plurality of threshold values uniquely determined by signal information in an optical signal are stored. If a compatible signal information item is added, the arrangement using the memory 53 as in the third embodiment can be adapted only by adding threshold values corresponding to the additional information item to the memory 53 in contrast with the arrangement using the hardware switches in the second embodiment. A space saving effect with respect to the electrical circuit scale can be realized in this way.

The computation circuit 52 reads out from the memory 53 the threshold value corresponding to input signal information, and outputs the read threshold value in digital form. The DA converter 54 converts the digital value output from the computation circuit into an analog value and outputs this value to the optical signal loss detection circuit 4 in the following stage. Use of digital processing based on a piece of software ensures higher noise tolerance to respect to disturbance electrical circuit noise in comparison with the analog circuit. In other respects, the basic effects of this embodiment are the same as those of the first embodiment.

A micro-controller unit (MPU) in which the computation circuit 52, the memory 53 and the DA converter 54 are integrated on one chip may be used. Data exchange between the computation circuit 52, the memory 53 and the DA converter 54 may be performed by any of communication methods such as a two-wire serial communication, I2C and SPI.

Fourth Embodiment

Figure 4:
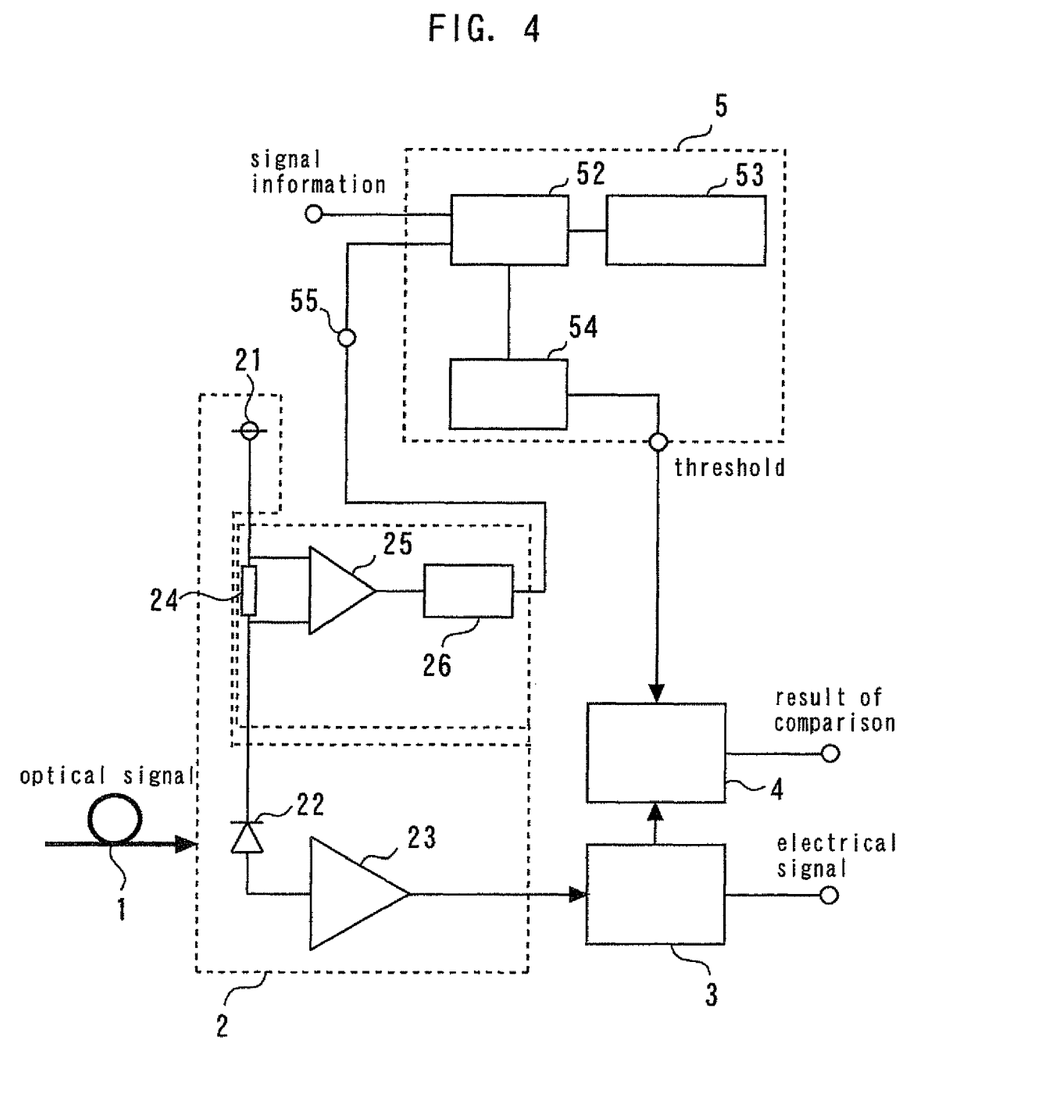
FIG. 4 is a diagram showing the configuration of a light receiver according to a fourth embodiment of the present invention.

FIG. 4 is a diagram showing the configuration of a light receiver according to a fourth embodiment of the present invention. In the fourth embodiment, the photoelectric conversion circuit 2 has an applied voltage terminal 21 of a photoelectric conversion element (light receiving element, photo-diode (PD)), a light receiving element 22, and a current-voltage conversion circuit 23 (trans-impedance amplifier (TIA)). The applied voltage terminal 21 of the light receiving element, the light receiving element 22 and the TIA 23 form a basic block constituting the ordinary photoelectric conversion circuit 2 and are included in the photoelectric conversion circuits 2 shown in FIGS. 1 to 3. The light receiver according to this embodiment further has, as a light power detection circuit for monitoring photo-current flowing through the light receiving element, an input terminal 55 of the threshold adjustment circuit, a resistor element 24, a voltage amplifier 25 which amplifiers the voltage across the resistor element 24, and an analog to digital (AD) converter 26. The resistor element 24, the voltage amplifier 25 and the AD converter 26 form an input light power circuit. In other respects, the configuration of the fourth embodiment is the same as that of the first or third embodiment.

In the fourth embodiment, the differential voltage across the resistor element 24 connected in series to the light receiving element 22 is multiplied by the voltage amplifier 25 and input to the AD converter 26. The AD converter 26 converts the output voltage from the voltage amplifier 25 into a digital value and outputs the digital value as input light power to the computation circuit 52. A plurality of threshold values uniquely determined by signal information are stored in the memory 53. In the memory 53 are also stored light power adjustment values for adjusting the threshold value according to input light power. The computation circuit 52 performs computation by reading out from the memory 53 the threshold value corresponding to signal information and the light power adjustment value corresponding to input light power, and outputs in digital form the threshold value adjusted by using the light power adjustment value.

As a method of computation in the above-described computation circuit 52, (1) a method in which an adjusted threshold value table formed as a two-dimensional matrix of threshold values and light power adjustment values is prepared in advance and stored in the memory 53, and in which the computation circuit 52 uniquely extracts an adjusted threshold value from the table according to input signal information and input light power, (2) a method in which a mathematical expression having an adjusted threshold value as an output is formed and a light power adjustment value and a threshold value are substituted as a variable and/or a constant in the mathematical expression to compute an adjusted threshold value, and other methods are conceivable.

The DA converter 54 converts the digital value output from the computation circuit 52 into an analog value and outputs the analog value to the optical signal loss detection circuit 4 in the following stage.

Thus, setting of an adjusted threshold value factoring in input light power is enabled. Input light power, which is the direct current component of an input signal, can be expressed by equation (10) using the average received light power Pin [W], the conversion efficiency R [A/W] and the dc resistance Re [ohm] of the resistor element 24.

$$Pin \times R \times Re \times A24 \qquad (10)$$

A larger dynamic range of input light power can be secured in comparison with the dynamic range of the output signal from the electric amplifier 3, since the input light power detection circuit is positioned in the initial stage of the light receiver. In actuality, a constraint is ordinarily imposed on the dynamic range of the electric amplifier 3. In signal detection using the electric amplifier 3, therefore, input information in the vicinity of the maximum receiving sensitivity inputtable to the light receiving element 22 cannot be detected with accuracy.

In this embodiment, signal information in the vicinity of the minimum receiving sensitivity is detected by using the electric amplitude of the electric signal output from the electric amplifier 3. Signal information in the vicinity of the maximum receiving sensitivity inputtable to the light receiving element 22 can be detected as input light power, thus making it possible to accurately grasping a critical point of the dynamic range of input light power in which the light receiving element 22 can correctly receive a signal. If high input light power close to the critical point such as to damage the light receiving element 22 is input, the computation circuit 52 outputs the threshold value adjusted on the basis of the critical point to the optical signal loss detection circuit 4.

The optical signal loss detection circuit 4 sends out an optical signal loss detection result when the electrical signal from the electric amplifier 3 exceeds the adjusted threshold value, and the host (not shown) that receives the detection result stops sending the optical signal 1. This process is effective as control for avoiding damage to the light receiving element 22. Thus, a signal break in an optical signal can be detected through a wider dynamic range with respect to each signal information item.

In this embodiment, therefore, detection of a signal break in an optical signal can be performed by following not only the receiving sensitivity BER but also input light power, and setting of the threshold value with higher accuracy is thereby enabled in setting of the threshold value based on signal information in maintenance operation of the optical communication system, while the same effects as the first or third embodiment are also achieved. In this way, the optical signal loss detection function can be improved to increase the operation efficiency of the transmission device.

While the detection of input light power as a voltage value by the resistor element 24 has been described, the arrangement may be such that a current mirror circuit formed of transistors and resistor elements is used between the light receiving element 22 and the applied voltage terminal 21 to detect the current flowing through the light receiving element 22 for detection of input light power. The light receiving element 22 is not limited to the photo-diode. An avalanche photo-diode (APD) may be used.

Fifth Embodiment

Figure 5:
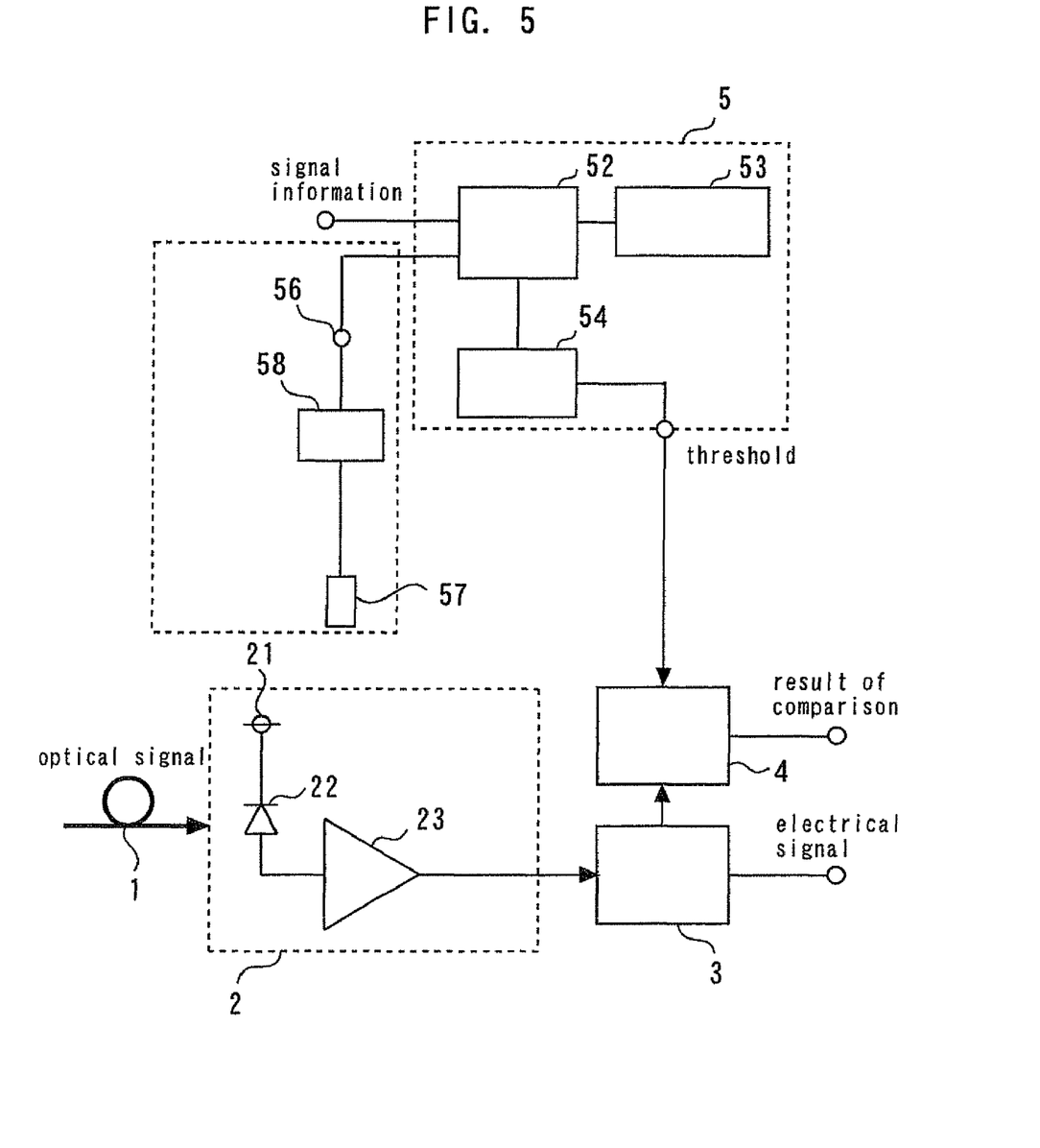
FIG. 5 is a diagram showing the configuration of a light receiver according to a fifth embodiment of the present invention.

FIG. 5 is a diagram showing the configuration of a light receiver according to a fifth embodiment of the present invention. The light receiver according to the fifth embodiment further has an input terminal 56 of the threshold value adjustment circuit, a temperature detecting element 57 (thermometer) and an AD converter 58. In other respects, the configuration of the fifth embodiment is the same as that of the first or third embodiment.

In the fifth embodiment, the ambient temperature around the photoelectric conversion circuit 2 is detected by using the temperature detecting element 57. Temperature information is converted into a digital value by the AD converter 58 and the digital value is input to the computation circuit 52.

As shown in equations (6) to (8), thermal noise $\sigma_T$ that determines the receiving sensitivity BER changes with the absolute temperature T. Therefore the receiving sensitivity BER varies depending on the ambient temperature. A plurality of threshold values uniquely determined according to signal information in an optical signal are stored in the memory 53. In the memory 53 are also stored temperature adjustment values for adjusting the threshold value according to the ambient temperature. The computation circuit 52 performs computation by reading out from the memory 53 the threshold value corresponding to input signal information and the temperature adjustment value corresponding to the ambient temperature, as does that in the fourth embodiment. The computation circuit 52 outputs in digital form the threshold value adjusted by using the temperature adjustment value. The DA converter 54 converts the digital value output from the computation circuit 52 into an analog value and outputs the analog value to the optical signal loss detection circuit 4 in the following stage.

As described above, the computation circuit 52 can obtain an adjusted threshold value following the ambient temperature around the photoelectric conversion circuit 2 as well as signal information such as a communication protocol and a digital signal encoding method. Thus, in this embodiment, a signal break in an optical signal can be detected by following changes in ambient temperature as well as the receiving sensitivity BER, and setting of the threshold value with higher accuracy is thereby enabled in setting of the threshold value based on signal information, while the same effects as the first or third embodiment are also achieved. In this way, the optical signal loss detection function can be improved to increase the operation efficiency of the transmission device.

A thermistor, a diode or a transistor may be used as the temperature detecting element 57.

Sixth Embodiment

Figure 6:
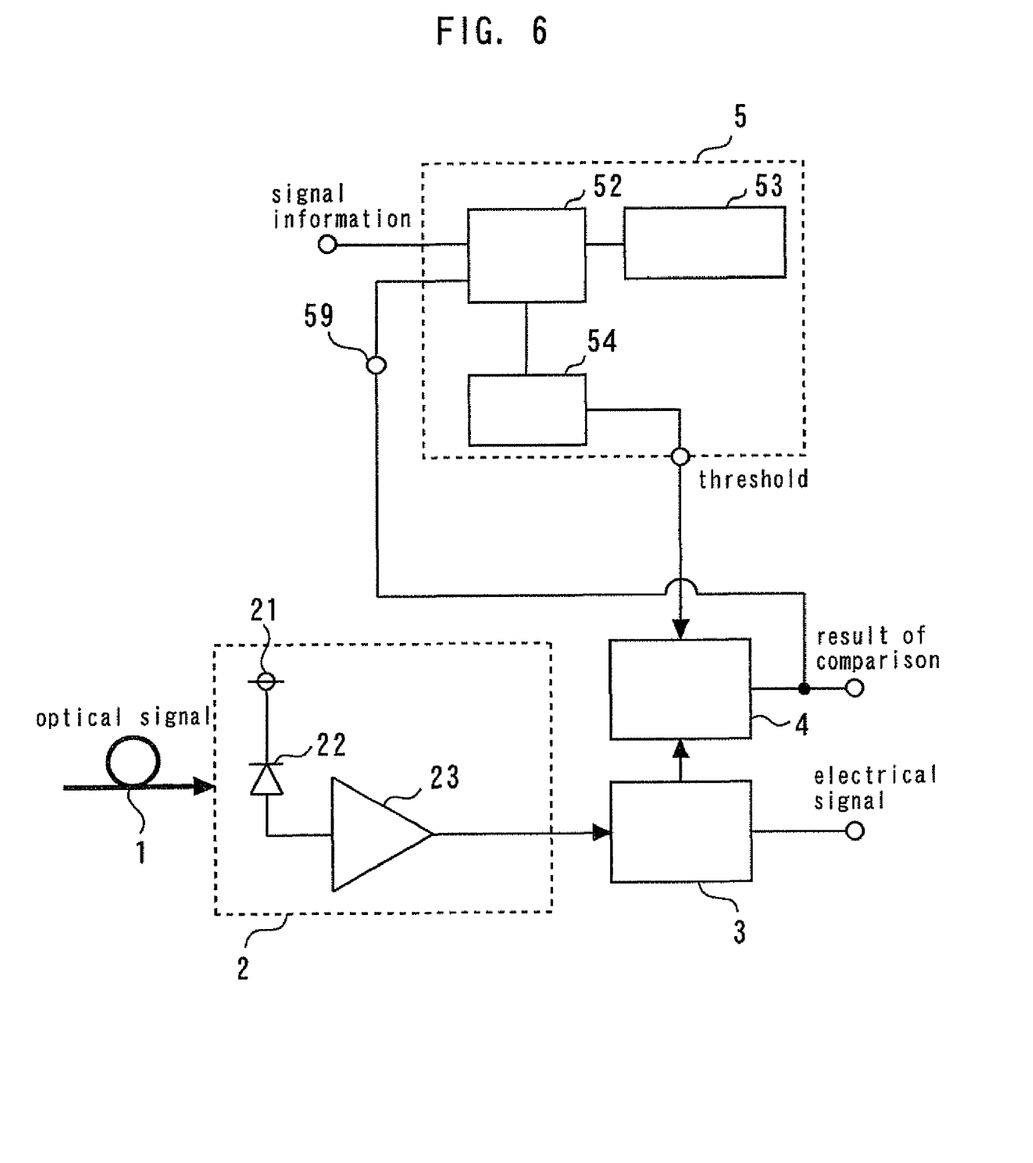
FIG. 6 is a diagram showing the configuration of a light receiver according to a sixth embodiment of the present invention.

FIG. 6 is a diagram showing the configuration of a light receiver according to a sixth embodiment of the present invention. In the light receiver according to the sixth embodiment, output information output from the optical signal loss detection circuit 4 is input to the computation circuit 52 through the input terminal 59. In other respects, the configuration of the sixth embodiment is the same as that of the first or third embodiment.

Figure 7:
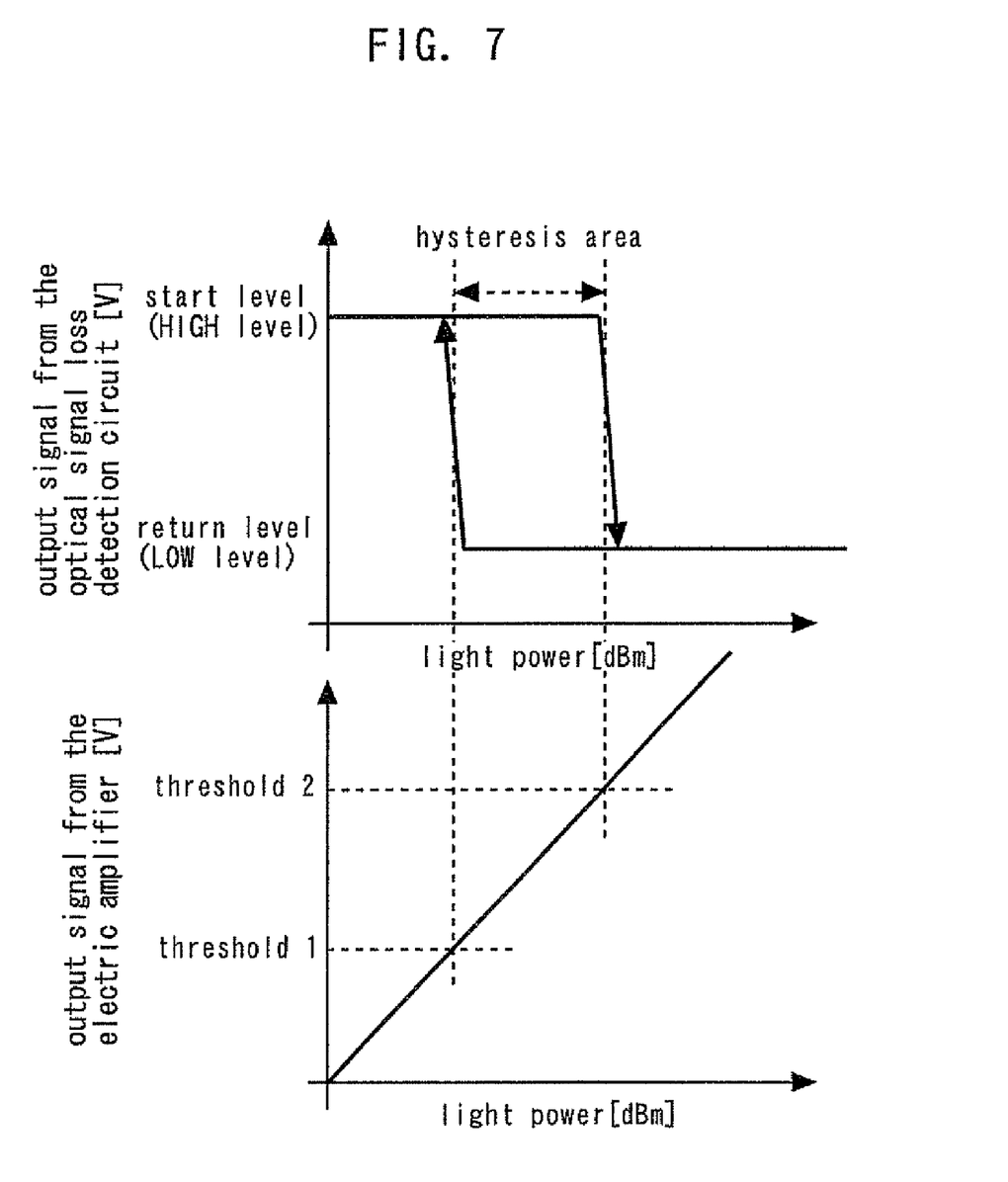
FIG. 7 is a diagram for explaining the principle of adjustment of hysteresis of the threshold value in the threshold adjustment circuit.

FIG. 7 is a diagram for explaining the principle of adjustment of hysteresis of the threshold value in the threshold adjustment circuit. The output signal from the optical signal loss detection circuit 4 is monitored at all times. For example, when the output signal is start level (low level), the computation circuit 52 selects a threshold value 1. When the output signal is return level (high level), the computation circuit 52 selects a threshold value 2.

For example, when the determination output from the optical signal loss detection circuit 4 is high level, the constant in equation (9) for computing the threshold value 2 is determined to be A=X. When the determination output from the optical signal loss detection circuit 4 is low level, the constant in equation (9) for computing the threshold value 1 is determined to be A=Y. Thus, the threshold value in the case of transition from high level to low level and the threshold value in the case of transition from low level to high level are selectively used under the same determination condition to enable setting of a hysteresis difference in the determination output from the optical signal loss detection circuit 4.

In the memory 53, hysteresis amounts to be set are stored as output signal adjustment values in advance. Accordingly, the output signal from the optical signal loss detection circuit 4 is input to the computation circuit 52 to enable the computation circuit 52 read out from the memory 53 the threshold value corresponding to the input signal information and the output signal adjustment value corresponding to the output signal from the optical signal loss detection circuit 4 and perform computation in the same manner as in the fourth embodiment to output in digital form the threshold value adjusted by using the output signal. The DA converter 54 converts the digital value output from the computation circuit 52 into an analog value and outputs this value to the optical signal loss detection circuit 4 in the following stage. That is, hysteresis amounts freely selected can be stored in the memory in advance to realize hysteresis characteristics with stability independently of communication protocols even in a situation where the signal gains in the photoelectric conversion circuit 23 and the electric amplifier 3 and the signal detection gain in the optical signal loss detection circuit 4 vary due to different communication protocols.

As described above, the threshold adjustment circuit 5 can factor in an arbitrary hysteresis difference as an output signal adjustment value in computation and can therefore obtain an adjusted threshold value following the output signal from the optical signal loss detection circuit 4 as well as signal information such as a communication protocol and a digital signal encoding method. Thus, in this embodiment, a signal break in an optical signal can be detected by following the determination output as well as the receiving sensitivity BER. In other respects, the basic effects of this embodiment are the same as those of the first or third embodiment.

Seventh Embodiment

Figure 8:
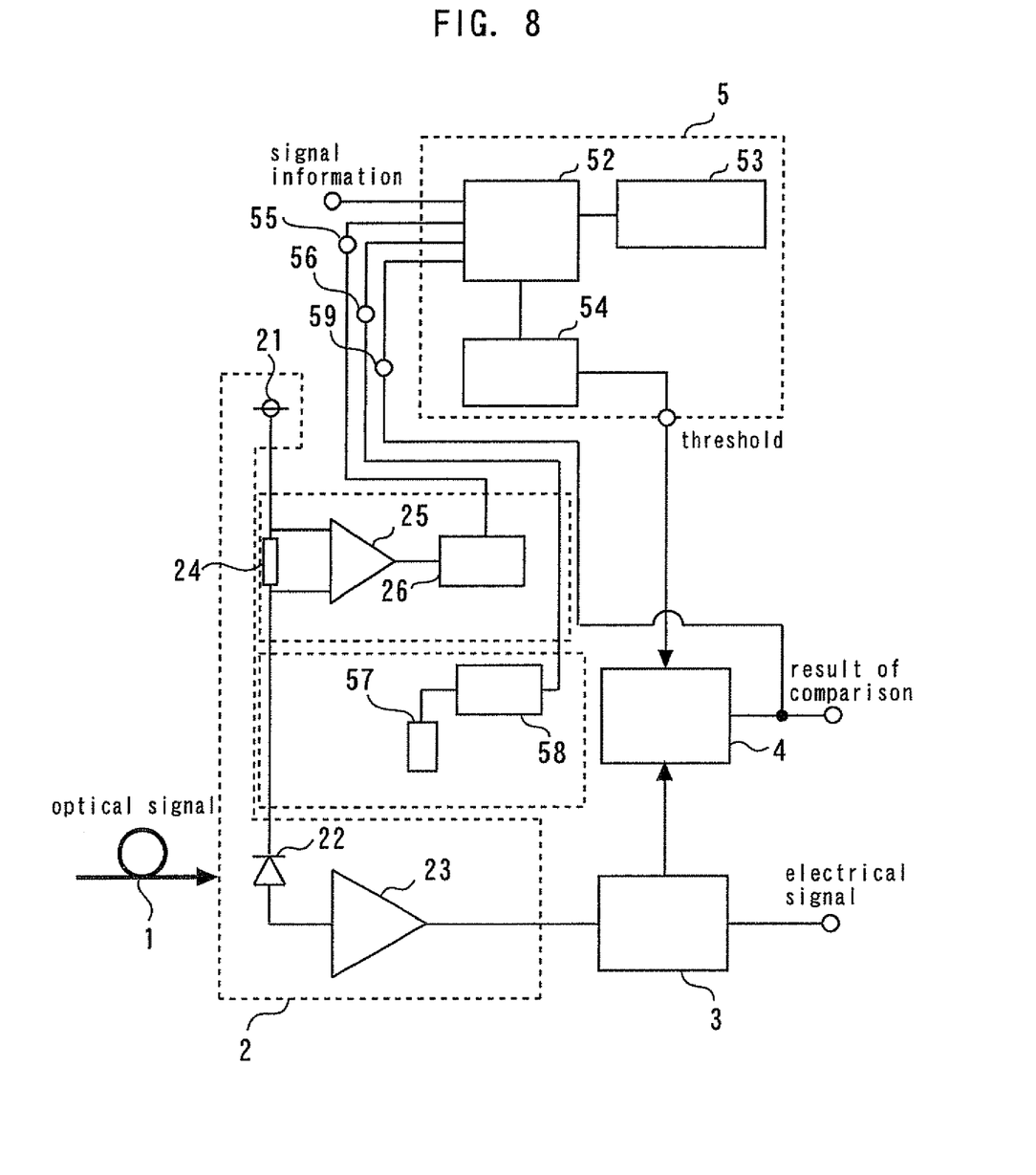
FIG. 8 is a diagram showing the configuration of a light receiver according to a seventh embodiment of the present invention.

FIG. 8 is a diagram showing the configuration of a light receiver according to a seventh embodiment of the present invention. The light receiver according to the seventh embodiment has a resistor element 24, a voltage amplifier 25, an AD converter 26 and an input terminal 55, as in the fourth embodiment, has an input terminal 56, a temperature detecting element 57 and an AD converter 58, as in the fifth embodiment, and inputs, to the computation circuit 52, via the input terminal 59, output information output from the optical signal loss detection circuit 4, as in the sixth embodiment. In other respects, the configuration of the seventh embodiment is the same as that of any of the first or third embodiment. The seventh embodiments has the same effects as any of the first and third to sixth embodiments.

In the memory 53 in the seventh embodiment are stored a plurality of threshold values uniquely determined according to signal information in an optical signal, light power adjustment values for adjusting the threshold value according to input light power, temperature adjustment values for adjusting the threshold value according to the ambient temperature and output signal adjustment values according to the output signal from the optical signal loss detection circuit 4. The computation circuit 52 computes an adjusted threshold value by factoring in these adjustment values. As a method of computation in the above-described computation circuit 52, (1) a method in which an adjusted threshold value table formed as a four-dimensional matrix of threshold values, light power adjustment values, temperature adjustment values and output signal adjustment values is prepared in advance and stored in the memory 53, and in which the computation circuit 52 uniquely extracts an adjusted threshold value from the table according to input signal information, input light power, the ambient temperature and the output signal.

(2) a method in which a mathematical expression having an adjusted threshold value as an output is formed and a light power adjustment value, the ambient temperature, the output signal and a threshold value are substituted as variables and/or constants in the mathematical expression to compute an adjusted threshold value, (3) a method using a combination of the above-described methods (1) and (2), for example, a method in which a mathematical expression having an adjusted threshold value as an output is formed and a primary adjusted value output from the two-dimensional matrix formed of threshold values and light power adjustment values, the ambient temperature and the output signal are substituted as variables and/or constants in the mathematical expression to compute an adjusted threshold value, and other methods are conceivable.

Setting of an adjusted threshold value is performed on the basis of all the information items about signal information in an optical signal/ambient temperature/input light power/the output signal from the optical signal loss detection circuit, thus enabling setting of an adjusted threshold value and hysteresis determined according to a communication protocol/ambient temperature/input light power.

Thus, a stable signal loss detection operation following the receiving sensitivity while considering the ambient temperature/input light power with respect to a plurality of communication protocols even in one light receiver can be realized. Further, the need for changing the light receiver in correspondence with a communication protocol is eliminated to reduce the investment cost for the optical communication device.

Obviously many modifications and variations of the present invention are possible in the light of the above teachings. It is therefore to be understood that within the scope of the appended claims the invention may be practiced otherwise than as specifically described.

The entire disclosure of a Japanese Patent Application No. 2006-350129, filed on Dec. 26, 2006 including specification, claims, drawings and summary, on which the Convention priority of the present application is based, are incorporated herein by reference in its entirety.

What is claimed is:

1. A light detector for detecting loss of an optical signal in an optical communication system, the light detector comprising: a photoelectric conversion circuit which converts an input optical signal into an electrical signal; an amplifier which amplifies the electrical signal from the photoelectric conversion circuit to produce an amplified signal; a threshold adjustment circuit which outputs a threshold value based on which of respective signal information is present in the input optical signal; and an optical signal loss detection circuit which compares electrical amplitude of the amplified signal from the amplifier to the threshold value from the threshold adjustment circuit, and which outputs results of comparing the amplified signal to the threshold value, wherein the threshold adjustment circuit comprises a memory storing a plurality of threshold values uniquely determined in correspondence to the respective signal information that may be in input optical signals, a computation circuit which reads from the memory the threshold value corresponding to the signal information in the input optical signal, and which outputs the threshold value read as a digital value, a digital-to-analog converter which converts the digital value output from the computation circuit into an analog value, and which outputs the analog value to the optical signal loss detection circuit, and a plurality of switches which select a corresponding threshold value, according to which signal information is in the input optical signal, from a plurality of threshold values set in advance, and which output the threshold value selected to the optical signal loss detection circuit.

2. A light detector for detecting loss of an optical signal in an optical communication system, the light detector comprising: a photoelectric conversion circuit which converts an input optical signal into an electrical signal; an amplifier which amplifies the electrical signal from the photoelectric conversion circuit to produce an amplified signal; a threshold adjustment circuit which outputs a threshold value based on which of respective signal information is present in the input optical signal; an optical signal loss detection circuit which compares electrical amplitude of the amplified signal from the amplifier to the threshold value from the threshold adjustment circuit, and which outputs results of comparing the amplified signal to the threshold value; and an input light power detection circuit which detects input light power of the input optical signal, wherein the threshold adjustment circuit comprises a first memory storing a plurality of threshold values uniquely determined in correspondence to the respective signal information that may be in the input optical signal, a second memory storing light power adjustment values for adjusting the threshold value according to the input light power, a computation circuit which reads from the first and second memories the threshold value and the light power adjustment value corresponding to the signal information and the light power of the input optical signal, and which outputs, as a digital value, the threshold value adjusted by the light power adjustment value, a digital-to-analog converter which converts the digital value from the computation circuit into an analog value, and which outputs the analog value to the optical signal loss detection circuit, and a plurality of switches which select a corresponding threshold value, according to which signal information is in the input optical signal, from a plurality of threshold values set in advance, and which output the threshold value selected to the optical signal loss detection circuit.

3. A light detector for detecting loss of an optical signal in an optical communication system, the light detector comprising: a photoelectric conversion circuit which converts an input optical signal into an electrical signal; an amplifier which amplifies the electrical signal from the photoelectric conversion circuit to produce an amplified signal; a threshold adjustment circuit which outputs a threshold value based on which of respective signal information is present in the input optical signal; an optical signal loss detection circuit which compares electrical amplitude of the amplified signal from the amplifier to the threshold value from the threshold adjustment circuit, and which outputs results of comparing the amplified signal to the threshold value; and a temperature detection circuit which detects ambient temperature around the photoelectric conversion circuit, wherein the threshold adjustment circuit comprises a first memory storing a plurality of threshold values uniquely determined in correspondence to the respective signal information that may be in the input optical signal, a second memory storing temperature adjustment values for adjusting the threshold value according to ambient temperature, a computation circuit which reads from the first and second memories the threshold value and the temperature adjustment value corresponding to the signal information of the input optical signal and the ambient temperature, and which outputs, as a digital value, the threshold value adjusted by the temperature adjustment value, a digital-to-analog converter which converts the digital value from the computation circuit into an analog value, and which outputs the analog value to the optical signal loss detection circuit, and a plurality of switches which select a corresponding threshold value, according to which signal information is in the input optical signal, from a plurality of threshold values set in advance, and which output the threshold value selected to the optical signal loss detection circuit.

4. A light detector for detecting loss of an optical signal in an optical communication system, the light detector comprising: a photoelectric conversion circuit which converts an input optical signal into an electrical signal; an amplifier which amplifies the electrical signal from the photoelectric conversion circuit to produce an amplified signal; a threshold adjustment circuit which outputs a threshold value based on which of respective signal information is present in the input optical signal; and an optical signal loss detection circuit which compares electrical amplitude of the amplified signal from the amplifier to the threshold value from the threshold adjustment circuit, and which outputs results of comparing the amplified signal to the threshold value, wherein the threshold adjustment circuit is supplied with the results from the optical signal loss detection circuit and comprises a first memory storing a plurality of threshold values uniquely determined in correspondence to the respective signal information that may be in the input optical signal, a second memory storing output signal adjustment values for adjusting the threshold value according to the results from the optical signal loss detection circuit, a computation circuit which reads from the first and second memories the threshold value and the output signal adjustment value corresponding to the input signal information and the results from the optical signal loss detection circuit, and which outputs, as a digital value, the threshold value adjusted by the output signal adjustment value, a digital-to-analog converter which converts the digital value output from the computation circuit into an analog value, and which outputs the analog value to the optical signal loss detection circuit, and a plurality of switches which select a corresponding threshold value, according to which signal information is in the input optical signal, from a plurality of threshold values set in advance, and which output the threshold value selected to the optical signal loss detection circuit.

5. A light detector for detecting loss of an optical signal in an optical communication system, the light detector comprising:

a photoelectric conversion circuit which converts an input optical signal into an electrical signal; an amplifier which amplifies the electrical signal from the photoelectric conversion circuit to produce an amplified signal; a threshold adjustment circuit which outputs a threshold value based on which of respective signal information is present in the input optical signal; an optical signal loss detection circuit which compares electrical amplitude of the amplified signal from the amplifier to the threshold value from the threshold adjustment circuit, and which outputs results of comparing the amplified signal to the threshold value; an input light power detection circuit which detects input light power of the input optical signal; and a temperature detection circuit which detects ambient temperature around the photoelectric conversion circuit, wherein the threshold adjustment circuit is supplied with the results from the optical signal loss detection circuit and comprises a first memory storing a plurality of threshold values uniquely determined in correspondence to the respective signal information that may be in the input optical signal, a second memory storing light power adjustment values for adjusting the threshold value according to the input light power, a third memory storing temperature adjustment values for adjusting the threshold value according to the ambient temperature, a fourth memory storing output signal adjustment values for adjusting the threshold value according to the results from the optical signal loss detection circuit, a computation circuit which reads from the first, second, third, and fourth memories the threshold value, the light power adjustment value, the temperature adjustment value, and the output signal adjustment value corresponding to the input information, the input light power, the ambient temperature, and the results, and which outputs, as a digital value, the threshold value adjusted by factoring in each of the adjustment values, a digital-to-analog converter which converts the digital value output from the computation circuit into an analog value, and which outputs the analog value to the optical signal loss detection circuit, and a plurality of switches which select a corresponding threshold value, according to which signal information is in the input optical signal, from a plurality of threshold values set in advance, and which output the threshold value selected to the optical signal loss detection circuit.

* * * * *